United States Patent
Fried-Gintis

(10) Patent No.: US 10,599,462 B2
(45) Date of Patent: Mar. 24, 2020

(54) AUTOMATIC DETECTION OF NETWORK HOTSPOTS IN A CLOUD INFRASTRUCTURE VIA AGGREGATE GEOLOCATION INFORMATION OF USER DEVICES

(71) Applicant: Nutanix, Inc., San Jose, CA (US)

(72) Inventor: Adam Michael Fried-Gintis, West Hills, CA (US)

(73) Assignee: NUTANIX, INC., San Jose, CA (US)

( * ) Notice: Subject to any disclaimer, the term of this patent is extended or adjusted under 35 U.S.C. 154(b) by 148 days.

(21) Appl. No.: 15/886,073

(22) Filed: Feb. 1, 2018

(65) Prior Publication Data

US 2019/0235905 A1 Aug. 1, 2019

(51) Int. Cl.
*G06F 9/455* (2018.01)
*G06F 16/27* (2019.01)
*G06F 16/29* (2019.01)

(52) U.S. Cl.
CPC .......... *G06F 9/45558* (2013.01); *G06F 16/27* (2019.01); *G06F 16/29* (2019.01); *G06F 2009/4557* (2013.01); *G06F 2009/45583* (2013.01)

(58) Field of Classification Search
CPC ............. G06F 9/45558; G06F 11/1469; G06F 11/1451; G06F 11/1458; G06F 11/1448; G06F 2009/45562; G06F 2009/4557; G06F 2009/45583; G06F 16/27; G06F 16/29
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |

(Continued)

OTHER PUBLICATIONS

Caludia Canali, Riccardo Lancellotti, "Automatic Virtual Machine Clustering based on Bhattacharyya Distance for Multi-Cloud Systems", 2013, Proceedings the 2013 International Workshop on Multi-cloud Applications and Federated Clouds, pp. 45-52 (Year: 2013).*

(Continued)

*Primary Examiner* — Jacob D Dascomb
(74) *Attorney, Agent, or Firm* — Foley & Lardner LLP

(57) ABSTRACT

A method of detecting hotspots in a cloud infrastructure via aggregate geolocation information of user devices is described. The method includes receiving a request to launch a virtual machine executing on behalf of a first user device and retrieving a first set of identifiers of recovery data from a first data center and a second set of identifiers of recovery data from a second data center. The recovery data may be associated with a plurality of virtual machines previously executed on behalf of a plurality of user devices. The method further includes generating a first distribution of geolocations based on the first set of identifiers and a second distribution of geolocations based on the second set of identifiers. The method includes selecting the first data center and replicating, at the first data center, recovery data associated with the virtual machine executing on behalf of the first user device.

27 Claims, 6 Drawing Sheets

(56) References Cited

U.S. PATENT DOCUMENTS 9,898,315 B1\* 2/2018 Li ................... G06F 9/45558
2019/0286530 A1\* 9/2019 Talley ............... G06F 9/45558

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano et al., (Curator: Self-Managing Storage for Enterprise Clusters), https://www.usenix.org/conference/nsdi17/, Mar. 27, 2017, pp. 1-16.
Cano, Ignacio, et al. "Curator: Self-Managing Storage for Enterprise Clusters" (Mar. 27, 2017), from https://www.usenix.org/conference/nsdi17/.

\* cited by examiner

AUTOMATIC DETECTION OF NETWORK HOTSPOTS IN A CLOUD INFRASTRUCTURE VIA AGGREGATE GEOLOCATION INFORMATION OF USER DEVICES

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

SUMMARY

Aspects of the present disclosure relate generally to a cloud infrastructure and a virtual environment management system, and more particularly to systems and methods for detecting hotspots in a cloud infrastructure via aggregate geolocation information of user devices.

One implementation disclosed herein is a method of detecting hotspots in a cloud infrastructure via aggregate geolocation information of user devices. The method includes receiving, by a leader node, a request to launch a virtual machine executing on behalf of a first user device. The method includes retrieving, in response to the request and by the leader node, a first set of identifiers of recovery data from a first data center and a second set of identifiers of recovery data from a second data center. The recovery data may be associated with a plurality of virtual machines previously executed on behalf of a plurality of user devices. The method includes generating, by the leader node, a first distribution of geolocations based on the first set of identifiers of recovery data and a second distribution of geolocations based on the second set of identifiers of recovery data. The method includes selecting, by the leader node, the first data center based on the first distribution and the second distribution. The method includes replicating, by the leader node and at the first data center, recovery data associated with the virtual machine executing on behalf of the first user device.

In some implementations, the method includes determining, by the leader node and based on the request, a geolocation of the first user device. In some implementations, the method includes extracting, by the leader node, a network identifier of the user device from the request. In some implementations, the method includes providing, by the leader node and to a geolocation database, the network identifier of the user device. In some implementations, the method includes receiving, by the leader node and from the geolocation database, the geolocation of the user device.

In some implementations, the method includes sending, by the leader node, a message to the first user device to cause the first user device to return the message to the leader node. In some implementations, the method includes measuring, by the leader node, a round-trip time of the message routing between the leader node and the first user device. In some implementations, the method includes determining, by the leader node and based on the round-trip time, a geolocation of the first user device.

In some implementations, retrieving the first set of identifiers of recovery data and the second set of identifiers of recovery data includes retrieving, by the leader node and from a database, a list of data centers of a data center cluster. In some implementations, retrieving the first set of identifiers of recovery data and the second set of identifiers of recovery data includes extracting, by the leader node, a plurality of network identifiers associated with the data centers. In some implementations, retrieving the first set of identifiers of recovery data and the second set of identifiers of recovery data includes sending, by the leader node and based on the plurality of network identifiers, a first request to the first data center requesting the first set of identifiers of recovery data and a second request to the second data center requesting the second set of identifiers of recovery data.

In some implementations, the method includes extracting, by the leader node, the first distribution of geolocations from the first set of identifiers of recovery data. In some implementations, the method includes extracting, by the leader node, the second distribution of geolocations from the second set of identifiers of recovery data. In some implementations, the method includes aggregating, by the leader node, the first distribution of geolocations into a plurality of first groups. In some implementations, the method includes aggregating, by the leader node, the second distribution of geolocations into a plurality of second groups. In some implementations, the method includes computing, by the leader node, a frequency score for each group of the first groups and the second groups.

In some implementations, the method includes extracting, by the leader node and from the first groups, a group of the first groups being associated with a geolocation of the first user device. In some implementations, the method includes extracting, by the leader node and from the second groups, a group of the second groups being associated with the geolocation of the first user device. In some implementations, the method includes comparing, by the leader node, the frequency score associated with the group of the first groups and the frequency score associated with the group of the second groups. In some implementations, the method includes selecting, by the leader node, the first data center based on determining that the frequency score associated with the group of the first groups being lower than the frequency score associated with the group of the second groups. In some implementations, each group comprises at least one of a city, a state, and a country.

In some implementations, the method includes storing, by the leader node and to the first data center, a copy of the virtual machine executing on behalf of the first user device, wherein the copy comprises a geolocation of the first user device. In some implementations, the method includes receiving, by a leader node and from a second user device, a request to launch a virtual machine executing on behalf of the second user device. In some implementations, a geolocation of the second user device matches the geolocation of the first user device. In some implementations, the method includes selecting, by the leader node, the second data center based on the first geographic distribution and the second geographic distribution. In some implementations, the method includes replicating, by the leader node and at the second data center, recovery data associated with the virtual machine executing on behalf of the second user device.

In another aspect, the present disclosure is directed to a system for detecting hotspots in a cloud infrastructure via aggregate geolocation information of user devices. The system includes a leader node. The leader node is configured to receive a request to launch a virtual machine executing on behalf of a first user device. The leader node is configured to retrieve, in response to the request, a first set of identifiers of recovery data from a first data center and a second set of identifiers of recovery data from a second data center. The recovery data is associated with a plurality of virtual machines previously executed on behalf of a plurality of user devices. The leader node is configured to generate a first distribution of geolocations based on the first set of identifiers of recovery data and a second distribution of geolocations based on the second set of identifiers of recovery data. The leader node is configured to select the first data center based on the first distribution and the second distribution. The leader node is configured to replicate, at the first data center, recovery data associated with the virtual machine executing on behalf of the first user device.

In some implementations, the leader node is configured to determine, based on the request, a geolocation of the first user device. In some implementations, the leader node is configured to extract a network identifier of the user device from the request. In some implementations, the leader node is configured to provide, to a geolocation database, the network identifier of the user device. In some implementations, the leader node is configured to receive, from the geolocation database, the geolocation of the user device. In some implementations, the leader node is configured to send a message to the first user device to cause the first user device to return the message to the leader node. In some implementations, the leader node is configured to measure a round-trip time of the message routing between the leader node and the first user device. In some implementations, the leader node is configured to determine, based on the round-trip time, a geolocation of the first user device.

In some implementations, the leader node is configured to retrieve, from a database, a list of data centers of a data center cluster. In some implementations, the leader node is configured to extract a plurality of network identifiers associated with the data centers. In some implementations, the leader node is configured to send, based on the plurality of network identifiers, a first request to the first data center requesting the first set of identifiers of recovery data and a second request to the second data center requesting the second set of identifiers of recovery data. In some implementations, the leader node is configured to extract the first distribution of geolocations from the first set of identifiers of recovery data. In some implementations, the leader node is configured to extract the second distribution of geolocations from the second set of identifiers of recovery data. In some implementations, the leader node is configured to aggregate the first distribution of geolocations into a plurality of first groups. In some implementations, the leader node is configured to aggregate the second distribution of geolocations into a plurality of second groups. In some implementations, the leader node is configured to compute a frequency score for each group of the first groups and the second groups.

In some implementations, the leader node is configured to extract, from the first groups, a group of the first groups being associated with a geolocation of the first user device. In some implementations, the leader node is configured to extract, from the second groups, a group of the second groups being associated with the geolocation of the first user device. In some implementations, the leader node is configured to compare the frequency score associated with the group of the first groups and the frequency score associated with the group of the second groups. In some implementations, the leader node is configured to select the first data center based on determining that the frequency score associated with the group of the first groups being lower than the frequency score associated with the group of the second groups. In some implementations, each group comprises at least one of a city, a state, and a country. In some implementations, the leader node is configured to store, to the first data center, a copy of the virtual machine executing on behalf of the first user device, wherein the copy comprises a geolocation of the first user device.

In some implementations, the leader node is configured to receive, from a second user device, a request to launch a virtual machine executing on behalf of the second user device. In some implementations, a geolocation of the second user device may match the geolocation of the first user device. In some implementations, the leader node is configured to select the second data center based on the first geographic distribution and the second geographic distribution. In some implementations, the leader node is configured to replicate, at the second data center, recovery data associated with the virtual machine executing on behalf of the second user device.

In another aspect, the present disclosure is directed to a non-transitory computer readable storage medium to store a computer program configured to execute a method for detecting hotspots in a cloud infrastructure via aggregate geolocation information of user devices. The method includes receiving, by a leader node, a request to launch a virtual machine executing on behalf of a first user device. The method includes retrieving, in response to the request and by the leader node, a first set of identifiers of recovery data from a first data center and a second set of identifiers of recovery data from a second data center; wherein the recovery data associated with a plurality of virtual machines previously executed on behalf of a plurality of user devices. The method includes generating, by the leader node, a first distribution of geolocations based on the first set of identifiers of recovery data and a second distribution of geolocations based on the second set of identifiers of recovery data. The method includes selecting, by the leader node, the first data center based on the first distribution and the second distribution. The method includes replicating, by the leader node and at the first data center, recovery data associated with the virtual machine executing on behalf of the first user device.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

Illustrative embodiments will hereafter be described with reference to the accompanying drawings.

Figure 1A:
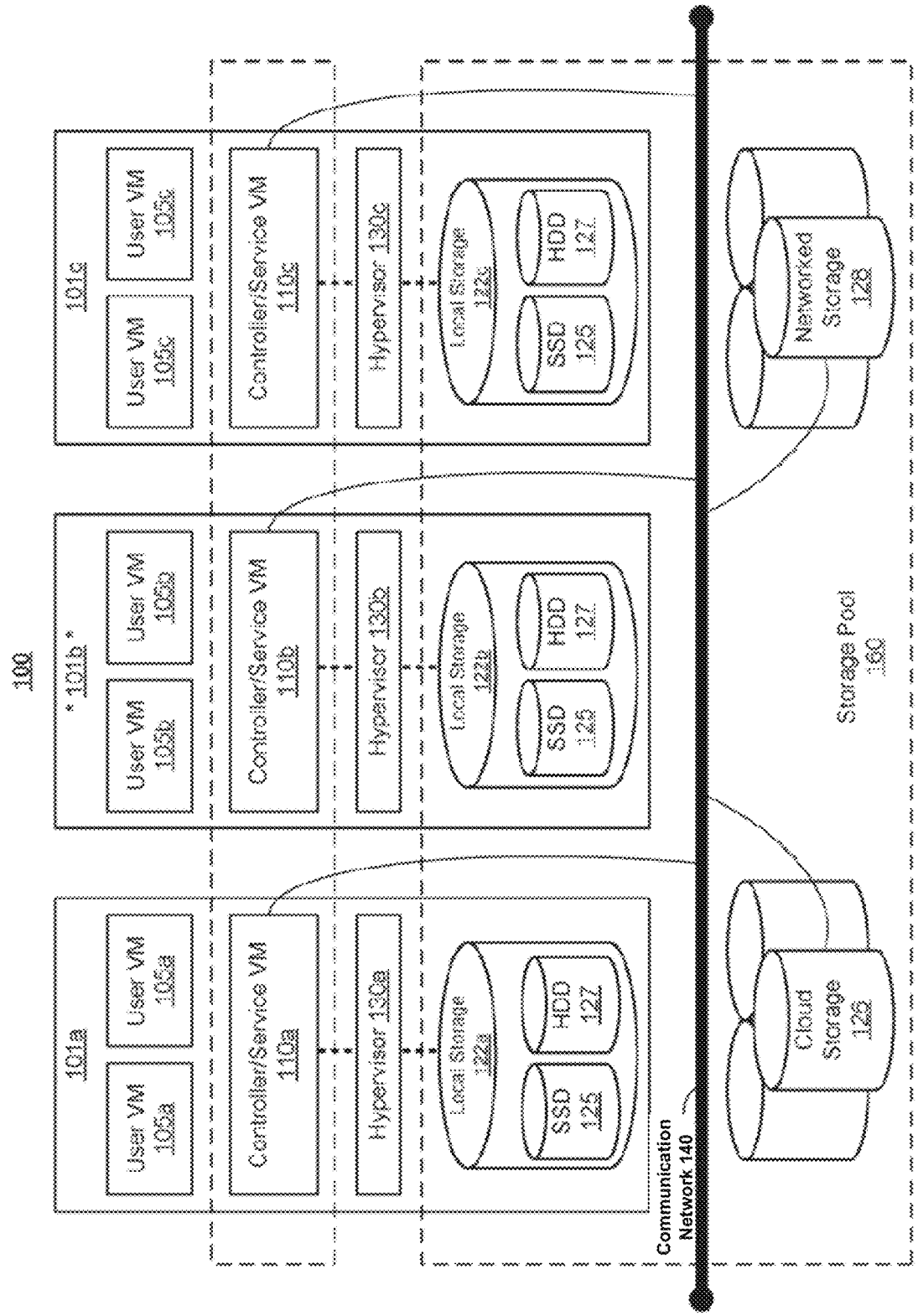
FIG. 1A is a block diagram illustrating a clustered virtualization environment, according to an illustrative implementation.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Providers of cloud computing storage and virtual machine resources safeguard their customer's on-premise servers, applications, and data from disaster causing disruptions by replicating and hosting the customer's physical/virtual servers onto appliance and/or cloud computing environments hosted at the provider's various recovery data centers. In the event of system failure, the customer can instantly switch, or failover, from using their production systems to using their replicas on the appliance or in the cloud. When the disaster has passed, the customer can switch back, or failback, to their production systems—updated with of all changes that occurred while they were down.

In order for such recovery services to be cost-effective for the customer and profitable for the cloud provider, the cloud provider must massively over-subscribe the computing resources at their recovery data centers relative to the customer resources that the recovery service replicates. However, doing so without regard for the geolocation of the customers whose data the recovery service replicates exposes the cloud provider to a possible networking catastrophe. For example, the cloud provider may inadvertently replicate a majority of the data owned by its California-based customers to only a select few of its recovery data centers, rather than evenly distributing the customer data to multiple recovery data center locations. Consequently, a state-wide geographic event such as an earthquake may cause a large-scale power-down of the California-based customer's on-premise servers. Yet, when their systems are brought back on line, these same customers likely may simultaneously attempt to retrieve their back-up copies from the select few recovery data centers that store their data. This unexpected surge in computing resource demand may cripple these recovery data centers, leading to severe networking congestion and degrading the cloud-computing storage and virtualization experience for the customer.

Accordingly, the systems and methods discussed herein detects such hotspots in a cloud infrastructure by determining the optimal recovery data center to replicate a customer's applications and data based on the geolocation of a customer; thereby, allowing a cloud provider to avoid a single external event that could otherwise cause a customer-facing failure of the recovery service.

In general, a leader node of a live data center receives a request from a user device (e.g., mobile phone, laptop, a server) to launch a virtual machine executing on behalf of the user device. In response to the request, the leader node determines a geolocation of the first user device based on the request. The leader node retrieves a first set of identifiers of recovery data from a first recovery data center and a second set of identifiers of recovery data from a second recovery data center, where the recovery data is associated with a plurality of virtual machines that were previously executed on behalf of a plurality of user devices. The leader node generates a first distribution of geolocations based on the first set of identifiers of recovery data and a second distribution of geolocations based on the second set of identifiers of recovery data. The leader node then selects the first data center based on determining from each distribution that the first data center stores recovery data that is associated with fewer customers located in the same geolocation of the first user device as opposed to the data stored at the second recovery data center. Consequently, the leader node replicates, at the first data center, recovery data that is associated with the virtual machine executing on behalf of the first user device.

Virtualization Technology and Environment

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A is a block diagram illustrating a clustered virtualization environment 100 according to an illustrative implementation. The architecture of FIG. 1A can be implemented for a distributed platform that contains multiple host machines 101a-c (also collectively referred to herein as "host machines 101") that manage multiple tiers of storage. The multiple tiers of storage may include storage that is accessible through communication network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the respective host machine 101 and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101 may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to communication network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to communication network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a communication network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
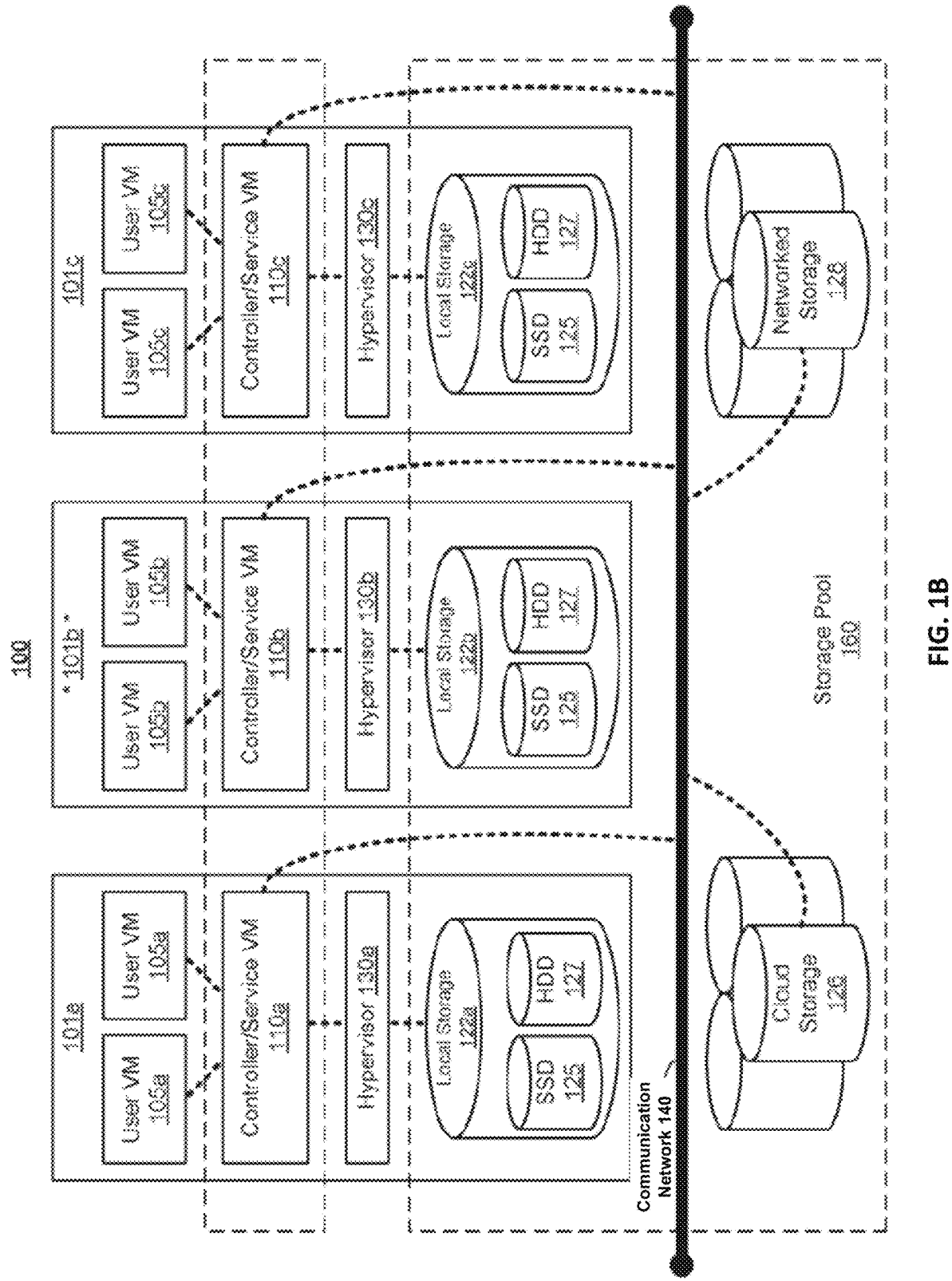
FIG. 1B is a block diagram illustrating the data flow within an example clustered virtualization environment, according to an illustrative implementation.

FIG. 1B illustrates data flow within an example clustered virtualization environment 100 according to an illustrative implementation. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via communication network 140 to cloud storage 126 or NAS 128, or by connecting via communication network 140 to local storage 122b-c within another host machine 101b-c (e.g., via connecting to another CVM 110b or 110c). In some implementations, any suitable computing device (e.g., computing system 300) may be used to implement a host machine 101.

Detecting Hotspots Based on Aggregate Geolocation Information of User Devices

Figure 2:
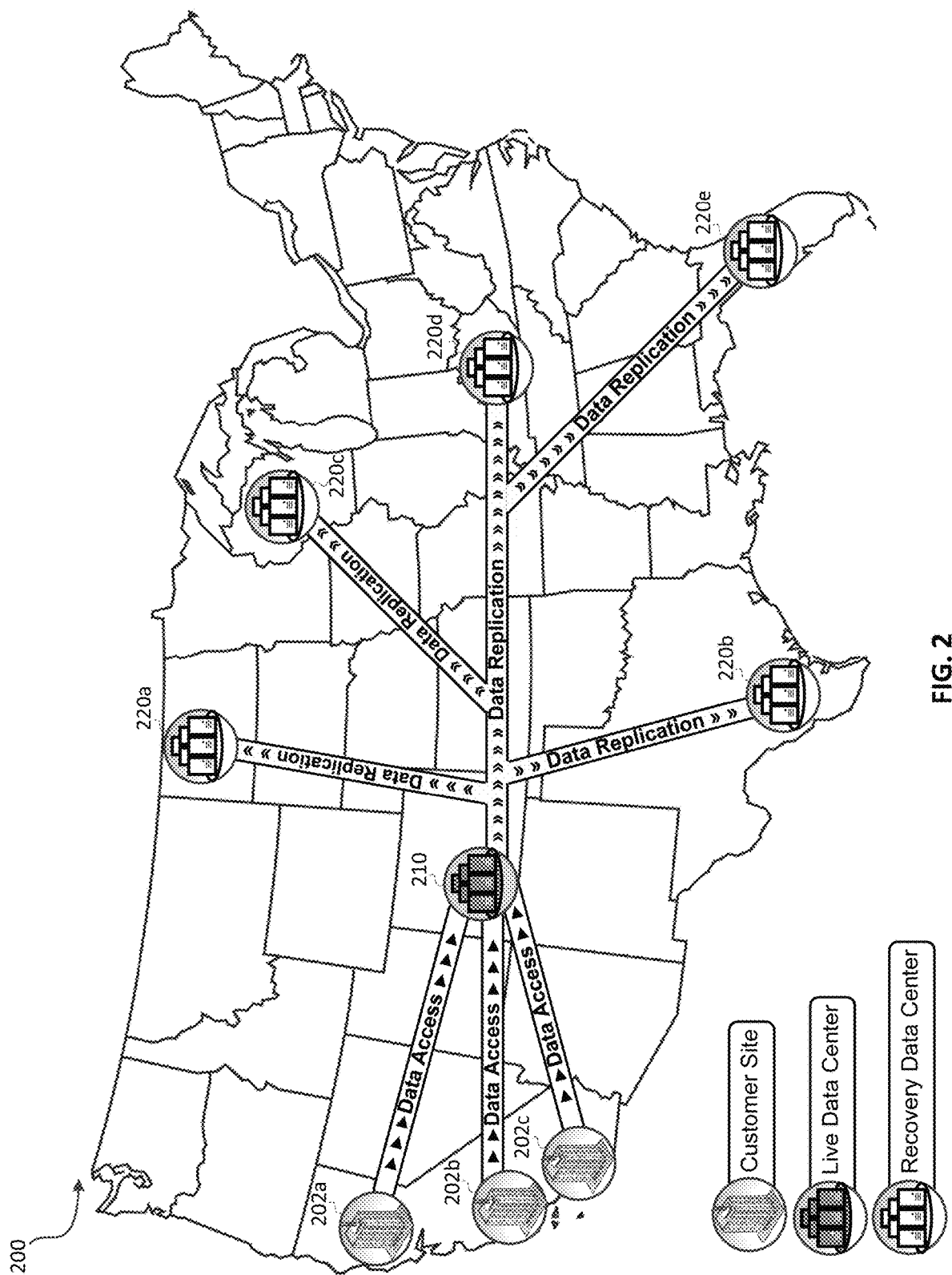
FIG. 2 is a block diagram depicting an example environment for detecting hotspots in a cloud infrastructure via aggregate geolocation information of user devices, according to an illustrative implementation.

FIG. 2 is a block diagram depicting an example environment for detecting hotspots in a cloud infrastructure via aggregate geolocation information of user devices, according to an illustrative implementation. The environment 200 includes a plurality of customer sites, such as customer site 202a, 202b, and 202c (collectively referred to herein as "customer sites 202"). Each customer site includes a plurality of users 201 (not shown), each operating a user device (not shown) or remote computing device, such as a laptop, a desktop, a server, a host machine (such as host machine 101 in FIG. 1A), and/or a mobile device. Each customer may have an association with the customer site based on being an employee, an independent contractor, a member, a guest, etc. As shown, each customer site 202 is located in a city and state in the United States and physically/geographically separated from other customer sites 202a-c. For example, customer site 202a is located in San Francisco, Calif.; customer site 202b is located in Los Angeles, Calif.; and customer site 202c is located in San Diego, Calif. In some implementations, more than one customer sites 202 may be located in the same city and state, but identified by a unique identifier.

The environment 200 includes a live data center 210 for providing a user device with computing resources from a virtualization environment via a virtual machine and for storing a copy (e.g., replicating) of the virtual machine and data associated with the virtual machine at a recovery data center. The live data center 210 includes a collection of racks (not shown), where each rack includes a collection of host machines, such as host machines 101a-c in FIG. 1A. Each host machine 101a-c executes one or more virtual machines. The environment 200 includes a plurality of recovery data centers, such as recovery data centers 220a, 220b, 220c, 220d, and 220e (collectively referred to herein as "recovery data centers 220"). Each recovery data center includes a includes a collection of racks, where each rack includes a collection of host machines, such as host machines 101a-c in FIG. 1A. Each host machine 101a-c executes one or more virtual machines and/or stores a copy (referred to herein as "offline virtual machines") of virtual machines that were previously executed on behalf of a plurality of user devices. As shown, each recovery data center 220 is located in a city and state in the United States and physically/geographically separated from other recovery data centers 220. For example, recovery data center 220a is located in Minot, N. Dak.; recovery data center 220b is located in Corpus Christi, Tex.; recovery data center 220c is located in Madison, Wis.; recovery data center 220d is located in Louisville, Ky.; and recovery data center 220e is located in Tampa, Fla. In some implementations, more than one recovery data center 220 may be located in the same city and state.

The environment 200 may include many thousands of user devices, virtual machines, host machines 101, customer sites 202, live data centers 210, and/or recovery data centers 220. Each host machine 101 may contain a predetermined number of virtual nodes that function as the data storage layer within each host machine 101. Although each customer site 202, live data center 210, and recovery data center 220 is shown in a specific location in the United States, any of these entities may be located in any other town or city in the United States or any other country. The communication network 140 (as shown in FIG. 1A) may comprise one or more intermediary devices (not shown), including gateways, routers, firewalls, switches, network accelerators, Wi-Fi access points or hotspots, or other devices.

The environment 200 may include a geolocation database (not shown) for storing geolocation linkages provided from one or more interne service providers (not shown). A geolocation linkage associates (e.g., maps or links) a network identifier of any user device with a geolocation associated with the user device. For example, a network linkage associated with a user device 205 may be "210.43.92.4<=>San Diego, Calif.". The geolocation linkages indicate the geolocation of the user device at the time the user device sent a virtual machine request to the leader node of the live data center 210. In some implementations, the geolocation linkages indicate the real-time geolocation of the user device. For example, the one or more internet service providers may store a geolocation linkage in the geolocation database indicating that a user device was in San Diego, Calif. when it requested a virtual machine from the leader node of the live data center 210. The one or more internet service providers may then detect that the user device has since moved to Los Angeles, Calif. As a result, the one or more internet service providers may update the geolocation linkage associated with the user device to indicate that the geolocation of the user device is now Los Angeles, Calif.

The leader node of the live data center 210 may be configured to receive a request from a user device (e.g., a mobile device, a laptop, a desktop, another host machine 101, etc.) to execute a virtual machine on behalf of the remote computing device. The request may include, for example, a network identifier associated with the user device, a geolocation associated with the user device, and/or a date and time indicating when the request was made.

The leader node of the live data center 210 may be configured to retrieve, in response to the request, a first set of identifiers of recovery data from a first recovery data center (e.g., recovery data center 220a) and a second set of identifiers of recovery data from a second recovery data center (e.g., recovery data center 220b). The recovery data is associated with a plurality of virtual machines that were previously executed on behalf of a plurality of user devices. For example, a data center (e.g., live data center 210) previously launched a virtual machine (also referred to herein as an "online virtual machine") on one of its host machines 101 on behalf of a user device that, at the time of the request, was located at any one of the customer sites 202 in FIG. 2. The online virtual machine provides the user device with cloud storage and/or virtual machine resources from the network of host machines 101 at the live data center 210. To protect the virtual machine from data disasters and virtual machine failure, the leader node of the live data center 210 replicates the online virtual machine at one of the recovery data centers 220 as recovery data (also referred to herein as an "offline virtual machine"). The recovery data includes all data necessary for a leader node to relaunch the virtual machine, such as user data, virtual machine data, virtual machine controller data, virtual machine memory, virtual machine disks, virtual machine images, etc. The first set of recovery data may be stored on a local storage (e.g., local storage 122a in FIG. 1B) of the first recovery data center and the second set of recovery data may be stored on a local storage of the second recovery data center.

The leader node of the live data center 210 may send a request to each recovery data center requesting one or more identifiers to the recovery data stored in their respective local storages. In response, a host machine (e.g., host machine 101) or a leader node at each recovery data center may generate one or more identifiers that reference the memory location of the recovery data in the local storage. Example identifiers may be an object of any type, such as a pointer type, a tag type, a value type, a reference type, etc. In some implementations, the identifiers of the recovery data may include the geolocation of the user devices associated with the recovery data. For example, an identifier to the recovery data associated with a computing server located at customer site 202*a* may include a geolocation indicating San Francisco, Calif. In some implementations, a host machine (e.g., host machine 101) or a leader node at each recovery data center may store the identifiers of the recovery data in its local storage.

The leader node of the live data center 210 may be configured to determine a geolocation of a user device at the time the user device requested the leader node to launch a virtual machine executing on behalf of the user device. An example geolocation may include Global Positioning Satellite (GPS) coordinates, a street number, a street name, a city, a state, and/or a country. In some implementations, the leader node may determine a geolocation of a user device based on the virtual machine request that the user device sends to the leader node. For example, the leader node may extract from the request a network identifier (e.g., an Internet Protocol (IP) address, a Media Access Control (MAC) address) of the user device. The leader node may provide the extracted network identifier of the user device to a geolocation database (not shown). In response, the geolocation database may search its records for a network linkage having the same network identifier as the user device and send the associated geolocation to the leader node. The leader node may store the received geolocation of the user device in a local storage, such as local storage 122*a-c* in FIG. 1B. In some implementations, the leader node may determine a geolocation of a user device based on a routing message. For example, the leader node may generate a networking message (also referred to herein as a "routing message") that comprises a networking address or network identifier of the user device. The leader node sends the message to the user device to cause the user device to return the message back to the leader node. Upon receipt, the leader node measures a round-trip time of the message to route from the leader node, to the user device, and back to the leader node. The leader node then determines a geolocation of the user device based on the round-trip time.

The leader node of the live data center 210 may be configured to generate a distribution of geolocations of the user devices associated with the recovery data stored at a recovery data center. The distribution of geolocations take into account the probabilities of occurrence of a user device in a specific geographic location. The leader node calculates the geographic distribution for one or more recovery data centers 220 based on the set of identifiers of recovery data that it receives from the recovery data centers 220. For example, the leader node of the live data center 210 extracts a distribution of geolocations from the identifiers of recovery data received from the recovery data center 220*a*, which indicates the location of each user device at the time the user device made the request for a virtual machine. The leader node of the live data center 210 may assign a unique label (e.g., "Data Center #1") to each distribution of geolocations, allowing the leader node to quickly index/select the geographic distribution for a specific recovery data center 220. The leader node of the live data center 210 then aggregates each distribution of geolocations into a plurality of groups and computes a frequency score for each group of each distribution. For example, the leader node of the live data center 210 may extract the geolocations of one-hundred user devices from the identifiers of the recovery data received from recovery data center 220*b*. The leader node may then aggregate the geolocations indicating that some of the user devices are located in California into the "CA." group and the geolocations indicating that some of the user devices are located in Texas into the "TX" group. The leader node may then calculate a frequency score of 60% for the "Calif." group by counting the number of geolocations in the CA group (e.g., 60), counting the number of geolocations in the TX group (e.g., 40), dividing the number of geolocations in the CA group (e.g., 60) by the sum (e.g., 100) of the number of geolocations in the CA group and the number of geolocations in the TX group, and multiplying the sum by 100 (e.g., 100*0.6=60%). The leader node then repeats the calculation to generate a frequency score of 40% for the "TX" group.

The leader node of the live data center 210 may be configured to select a recovery data center 220 based on comparing the distributions of geolocations associated with each recovery data center 220. For example, the leader node of the live data center 210 may extract an individual group from the plurality of groups of the distribution of the geolocations that matches the geolocation of a user device requesting an online virtual machine. In some implementations, the leader node determines a match based on a string comparison (exact match). For example, the user device that requests an online virtual machine may be located at customer site 202*a* in San Francisco, Calif. As such, the leader node of the live data center 210 extracts the "San Francisco, Calif." group from each distribution of geolocations that it receives from the recovery data centers 220. In some implementations, the leader node may determine a match based on regular expression (a near match). For example, the leader node of the live data center 210 may extract any group of the distribution of geolocations indicating a location in California based on the San Francisco, Calif. geolocation of the user device.

The leader node of the live data center 210 then compares the frequency score associated with each extracted group to determine which group has the lowest frequency score. For example, the leader node may determine that 60% of the user devices associated with the recovery data stored at recovery data center 220*a* have San Francisco, Calif. locations and 40% of the user devices associated with the recovery data stored at recovery data center 220*b* have San Francisco, Calif. locations. In response, the leader node selects recovery data center 220*b*. The leader node replicates the online virtual machine executing on behalf of the first user device into recovery data and stores the recovery data at the selected recovery data center (e.g., recovery data center 220*b*). In some implementations, the leader node includes the geolocation of the user device in the recovery data that it stores at the recovery data center 220.

In some implementations, the leader node of the live data center 210 may be configured to receive a second request to launch a virtual machine executing on behalf of a second user device. In some implementations, the request may be received from the previous user device (e.g., first user device). In some implementations, the request may be received from the second user device. In some implementations, the second user device may be associated with a geolocation that matches the geolocation of the first user device.

In some implementations, the leader node of the live data center 210 may be configured to select a recovery data center 220 that is different than the recovery data selected for the first user device. For example, the leader node of the live data center 210 may determine based on the geographic distribution associated with recovery data center 220*b* and the geographic distribution associated with recovery data center 220*c* that fewer user devices located in California have their recovery data stored at recovery data center 220*c* than recovery data center 220*b*. Therefore, the leader node of the live data center 210 may select recovery data center 220*c* to store the recovery data it generates/replicates for the second user device.

Figure 3:
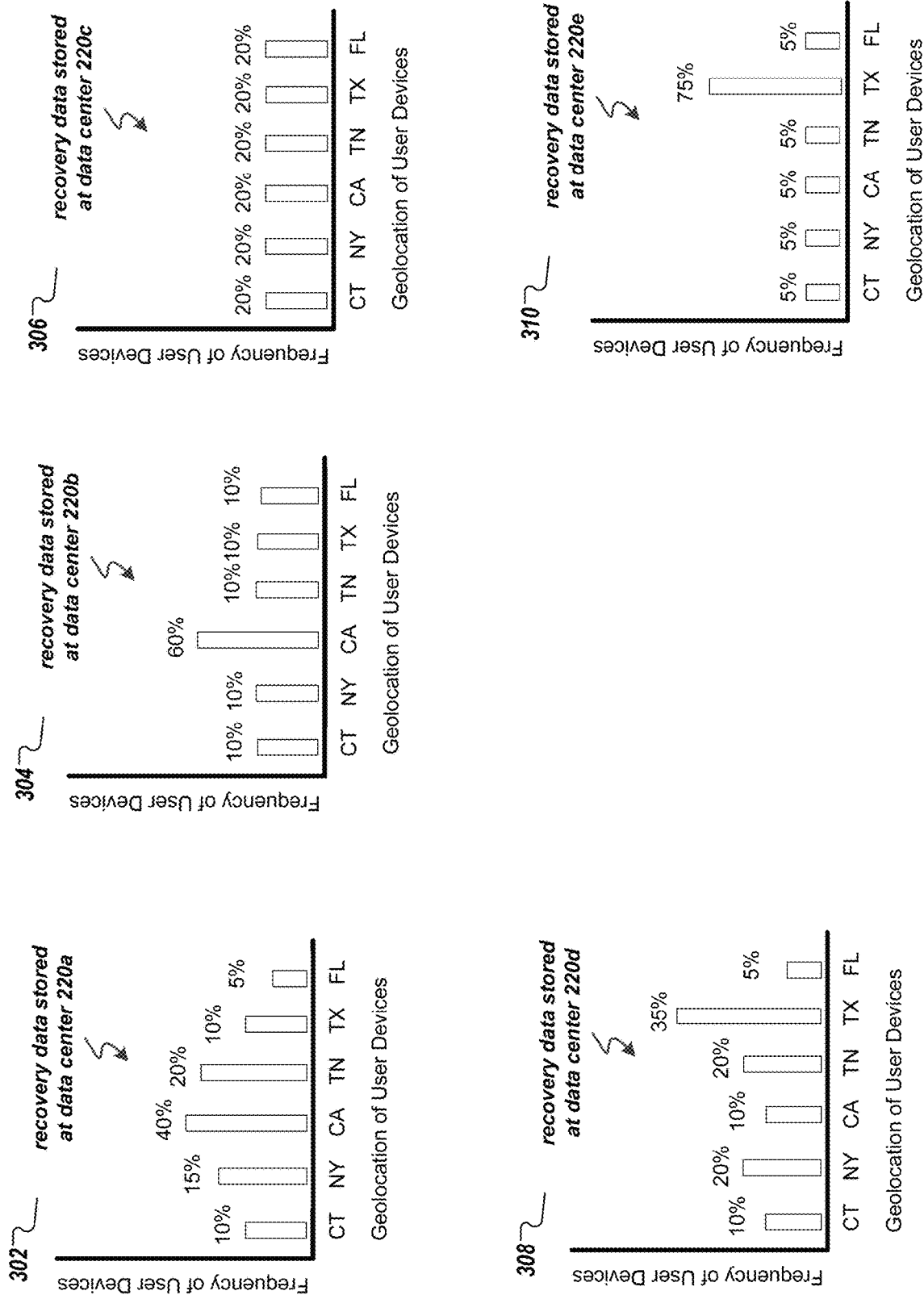
FIG. 3 is a diagram depicting distributions of geolocations of user devices extracted from the recovery data stored at recovery data centers, according to an illustrative implementation.

FIG. 3 is a diagram depicting distributions 302, 304, 306, 308, and 310 of geolocations of user devices extracted from the recovery data stored at recovery data centers 220*a*, 220*b*, 220*c*, 220*d*, and 220*e*; respectively. Each distribution of geolocations are plotted on a bar graph having an X-axis indicating a geolocation of a user device and a Y-axis indicating the frequency of user devices occurring at that geolocation. The frequency at each geolocation is also shown directly above the bar as a percentage.

Distribution 302 depicts the distribution of the geolocations of the user devices that have their recovery data stored at recovery data 220*a*. For example, 10% of the recovery data is associated with user devices located in CT., 15% of the recovery data is associated with user devices located in NY., 40% of the recovery data is associated with user devices located in CA, 20% of the recovery data is associated with user devices located in TN, 10% of the recovery data is associated with user devices located in TX, and 5% of the recovery data is associated with user devices located in FL. Distribution 304 depicts the distribution of the geolocations of the user devices that have their recovery data stored at recovery data 220*b*. For example, 10% of the recovery data is associated with user devices located in CT., 10% of the recovery data is associated with user devices located in NY., 60% of the recovery data is associated with user devices located in CA, 10% of the recovery data is associated with user devices located in TN, 10% of the recovery data is associated with user devices located in TX, and 10% of the recovery data is associated with user devices located in FL. Distribution 306 depicts the distribution of the geolocations of the user devices that have their recovery data stored at recovery data 220*c*. For example, 20% of the recovery data is each associated with user devices located in CT., NY., CA., TN, TX, and FL. Distribution 308 depicts the distribution of the geolocations of the user devices that have their recovery data stored at recovery data 220*d*. For example, 10% of the recovery data is associated with user devices located in CT., 20% of the recovery data is associated with user devices located in NY., 10% of the recovery data is associated with user devices located in CA, 20% of the recovery data is associated with user devices located in TN, 35% of the recovery data is associated with user devices located in TX, and 5% of the recovery data is associated with user devices located in FL. Distribution 310 depicts the distribution of the geolocations of the user devices that have their recovery data stored at recovery data 220*e*. For example, 5% of the recovery data is associated with user devices located in CT., 5% of the recovery data is associated with user devices located in NY., 5% of the recovery data is associated with user devices located in CA, 5% of the recovery data is associated with user devices located in TN, 75% of the recovery data is associated with user devices located in TX, and 5% of the recovery data is associated with user devices located in FL.

As an example, the leader node of the live data center 210 may receive a request to launch a virtual machine from a user device located in San Diego, Calif. In response, the leader node of the live data center 210 may generate distribution 302 from recovery data received from recovery data center 220*a*, distribution 304 from recovery data received from recovery data center 220*b*, distribution 306 from recovery data received from recovery data center 220*c*, distribution 308 from recovery data received from recovery data center 220*d*, and distribution 310 from recovery data received from recovery data center 220*e*. The leader node may then extract the CA-40% group from distribution 302, the CA-60% group from distribution 304, the CA-20% group from distribution 306, the CA-10% group from distribution 308, and the CA-5% group from distribution 310. The leader node may then compare each of these extracted groups to determine that the recovery data center 220*e* stores the least amount of recovery data associated with the geolocation matching the geolocation of the user device currently requesting an online virtual machine. In response, the leader node replicates the online virtual machine executing on behalf of the user device into recovery data and stores the recovery data at the recovery data center 220*e*.

Figure 4:
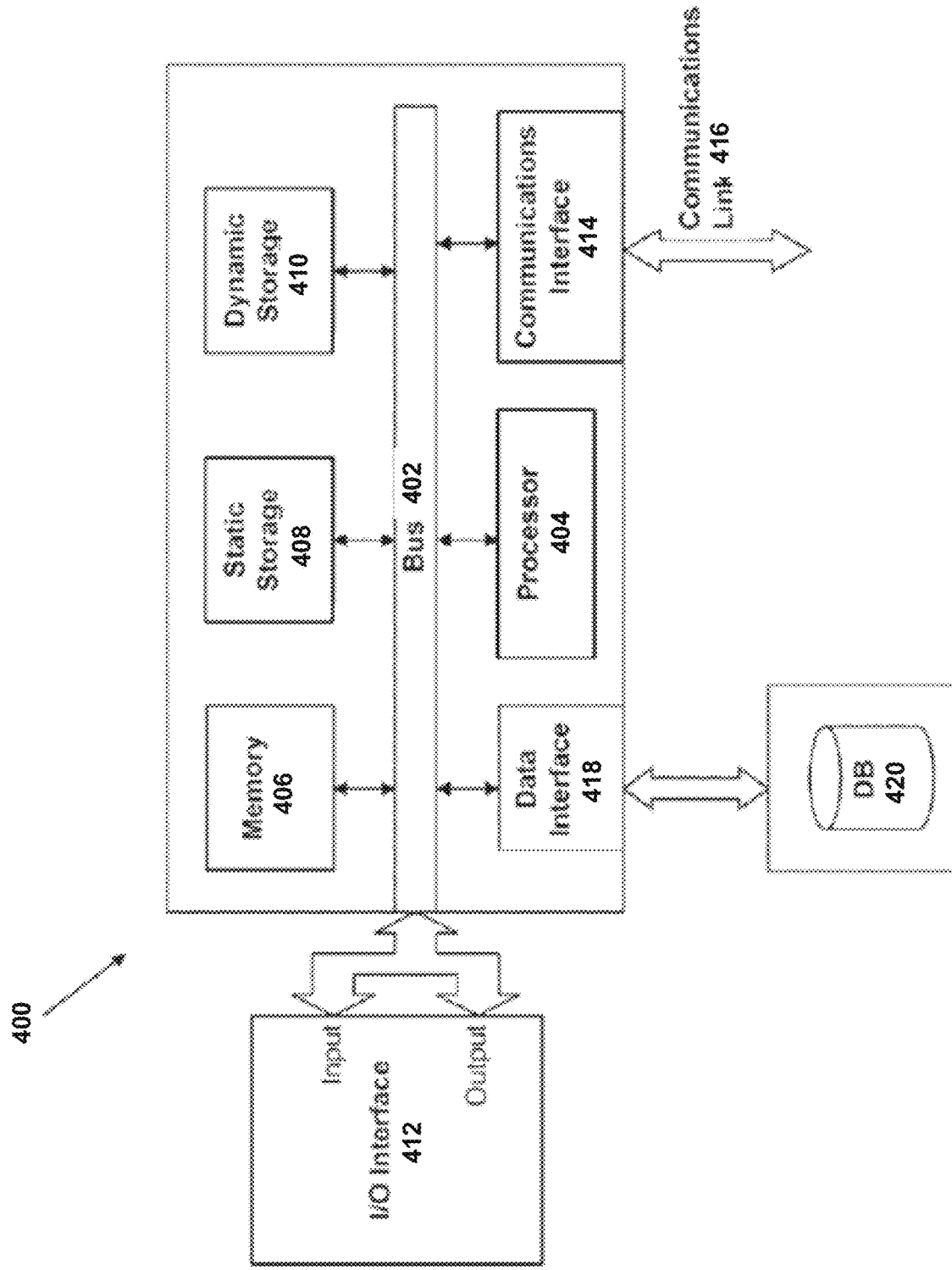
FIG. 4 is a block diagram of an illustrative computing system suitable for implementing particular embodiments.

FIG. 4 is a block diagram of an illustrative computing system 400 suitable for implementing particular embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 402 (e.g., an address bus and a data bus) or other communication mechanism for communicating information, which interconnects subsystems and devices, such as processor 404, memory 406 (e.g., RAM), static storage 408 (e.g., ROM), dynamic storage 410 (e.g., magnetic or optical), communication interface 414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 412 (e.g., keyboard, keypad, mouse, microphone). In particular embodiments, computer system 400 may include one or more of any such components.

In particular embodiments, processor 404 includes hardware for executing instructions, such as those making up a computer program. As an example and not by way of limitation, to execute instructions, processor 404 may retrieve (or fetch) the instructions from an internal register, an internal cache, memory 406, static storage 408, or dynamic storage 410; decode and execute them; and then write one or more results to an internal register, an internal cache, memory 406, static storage 408, or dynamic storage 410. In particular embodiments, processor 404 may include one or more internal caches for data, instructions, or addresses. This disclosure contemplates processor 404 including any suitable number of any suitable internal caches, where appropriate. As an example and not by way of limitation, processor 404 may include one or more instruction caches, one or more data caches, and one or more translation lookaside buffers (TLBs). Instructions in the instruction caches may be copies of instructions in memory 406, static storage 408, or dynamic storage 410, and the instruction caches may speed up retrieval of those instructions by processor 404. Data in the data caches may be copies of data in memory 406, static storage 408, or dynamic storage 410 for instructions executing at processor 404 to operate on; the results of previous instructions executed at processor 404 for access by subsequent instructions executing at processor 404 or for writing to memory 406, static storage 408, or dynamic storage 410; or other suitable data. The data caches may speed up read or write operations by processor 404. The TLBs may speed up virtual-address translation for processor 404. In particular embodiments, processor 404 may include one or more internal registers for data, instructions, or addresses. This disclosure contemplates processor 404 including any suitable number of any suitable internal registers, where appropriate. Where appropriate, processor 404 may include one or more arithmetic logic units (ALUs); be a multi-core processor; or include one or more processors 402. Although this disclosure describes and illustrates a particular processor, this disclosure contemplates any suitable processor.

In particular embodiments, I/O interface 412 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 412 for them. Where appropriate, I/O interface 412 may include one or more device or software drivers enabling processor 404 to drive one or more of these I/O devices. I/O interface 412 may include one or more I/O interfaces 412, where appropriate. Although this disclosure describes and illustrates a particular I/O interface, this disclosure contemplates any suitable I/O interface.

In particular embodiments, communication interface 414 includes hardware, software, or both providing one or more interfaces for communication (such as, for example, packet-based communication) between computer system 400 and one or more other computer systems 400 or one or more networks. As an example and not by way of limitation, communication interface 414 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 414 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 414 for any of these networks, where appropriate. Communication interface 414 may include one or more communication interfaces 414, where appropriate. Although this disclosure describes and illustrates a particular communication interface, this disclosure contemplates any suitable communication interface.

One or more memory buses (which may each include an address bus and a data bus) may couple processor 404 to memory 406. Bus 402 may include one or more memory buses, as described below. In particular embodiments, one or more memory management units (MMUs) reside between processor 404 and memory 406 and facilitate accesses to memory 406 requested by processor 404. In particular embodiments, memory 406 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 406 may include one or more memories 406, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 410 may include a hard disk drive (HDD), a floppy disk drive, flash memory, an optical disc, a magneto-optical disc, magnetic tape, or a Universal Serial Bus (USB) drive or a combination of two or more of these. Dynamic storage 410 may include removable or non-removable (or fixed) media, where appropriate. Dynamic storage 410 may be internal or external to computer system 400, where appropriate. This disclosure contemplates mass dynamic storage 410 taking any suitable physical form. Dynamic storage 410 may include one or more storage control units facilitating communication between processor 404 and dynamic storage 410, where appropriate.

In particular embodiments, bus 402 includes hardware, software, or both coupling components of computer system 400 to each other. As an example and not by way of limitation, bus 402 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCalif.) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 402 may include one or more buses 406, where appropriate. Although this disclosure describes and illustrates a particular bus, this disclosure contemplates any suitable bus or interconnect.

According particular embodiments, computer system 400 performs specific operations by processor 404 executing one or more sequences of one or more instructions contained in memory 406. Such instructions may be read into memory 406 from another computer readable/usable medium, such as static storage 408 or dynamic storage 410. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 404 for execution. Such a medium may take many forms, including but not limited to, nonvolatile media and volatile media. Non-volatile media includes, for example, optical or magnetic disks, such as static storage 408 or dynamic storage 410. Volatile media includes dynamic memory, such as memory 406.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 400; in alternative embodiments, two or more computer systems 400 coupled by communication link 416 (e.g., LAN, PTSN, or wireless network) may perform the sequence of instructions in coordination with one another.

Computer system 400 may transmit and receive messages, data, and instructions, including program, i.e., application code, through communication link 416 and communication interface 414. Received program code may be executed by processor 404 as it is received, and/or stored in static storage 408 or dynamic storage 410, or other non-volatile storage for later execution. A database 420 may be used to store data accessible by the system 400 by way of data interface 418.

Figure 5:
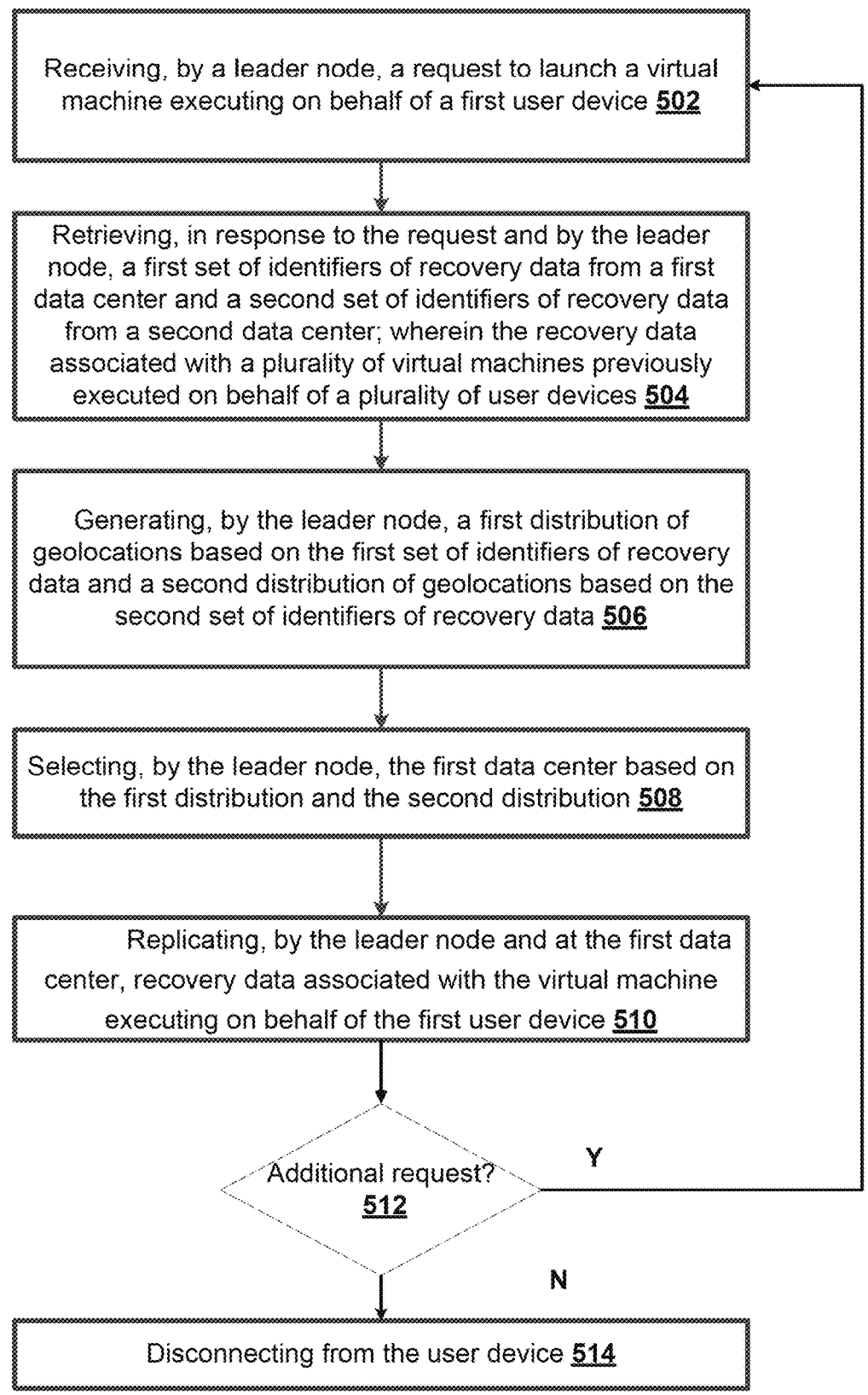
FIG. 5 is a flow diagram depicting a method for detecting hotspots in a cloud infrastructure via aggregate geolocation information of user devices, according to an illustrative implementation.

FIG. 5 is a flow diagram depicting a method for detecting hotspots in a cloud infrastructure via aggregate geolocation information of user devices, according to an illustrative implementation, according to an illustrative implementation. Additional, fewer, or different operations may be performed in the method depending on the particular implementation. In some implementations, some or all operations of method 500 may be performed by a host machine, such any host machine 101 in FIG. 1A. In some operations, some or all operations of method 500 may be performed by a leader node. Each operation may be re-ordered, added, removed, or repeated.

As shown, the method 500 begins with operation 502 where a leader node performs an operation of receiving, from a first user device, a request to launch a virtual machine executing on behalf of the first user device. At operation 504, the leader node performs the operation of retrieving, in response to the request, a first set of identifiers of recovery data from a first data center and a second set of identifiers of recovery data from a second data center. In some implementations, the recovery data is associated with a plurality of virtual machines previously executed on behalf of a plurality of user devices. At operation 506, the leader node performs the operation of generating a first distribution of geolocations based on the first set of identifiers of recovery data and a second distribution of geolocations based on the second set of identifiers of recovery data. At operation 508, the leader node performs the operation of selecting, by the leader node, the first data center based on the first distribution and the second distribution. At operation 510, the leader node performs the operation of replicating, at the first data center, recovery data associated with the virtual machine executing on behalf of the first user device. At operation 512, the leader node determines whether a user device sends an additional request to launch a virtual machine. If yes, then the leader node proceeds to operation 502 to repeat the process 500 for the additional request. Otherwise, the leader node proceeds to operation 514 to perform the operation of disconnecting from the remote computing device (e.g., user device).

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

It should be understood that no claim element herein is to be construed under the provisions of 35 U.S.C. § 112(f), unless the element is expressly recited using the phrase "means for."

What is claimed is:

1. A method comprising:
   receiving, by a leader node, a request to launch a virtual machine executing on behalf of a first user device;
   retrieving, in response to the request and by the leader node, a first set of identifiers of recovery data from a first data center and a second set of identifiers of recovery data from a second data center;
   generating, by the leader node, a first distribution of geolocations based on the first set of identifiers of recovery data and a second distribution of geolocations based on the second set of identifiers of recovery data;
   selecting, by the leader node, the first data center based on the first distribution and the second distribution; and
   replicating, by the leader node and at the first data center, recovery data associated with the virtual machine executing on behalf of the first user device.

2. The method of claim 1, further comprising [determining, by the leader node and based on the request, a geolocation of the first user device,
   wherein the recovery data is associated with a plurality of virtual machines and was previously executed on behalf of a plurality of user devices.

3. The method of claim 1, further comprising:
   extracting, by the leader node, a network identifier of the user device from the request;
   providing, by the leader node and to a geolocation database, the network identifier of the user device, and
   receiving, by the leader node and from the geolocation database, the geolocation of the user device.

4. The method of claim 1, further comprising:
   sending, by the leader node, a message to the first user device to cause the first user device to return the message to the leader node;
   measuring, by the leader node, a round-trip time of the message routing between the leader node and the first user device; and
   determining, by the leader node and based on the round-trip time, a geolocation of the first user device.

5. The method of claim 1, wherein retrieving the first set of identifiers of recovery data and the second set of identifiers of recovery data comprises:
   retrieving, by the leader node and from a database, a list of data centers of a data center cluster;
   extracting, by the leader node, a plurality of network identifiers associated with the data centers; and
   sending, by the leader node and based on the plurality of network identifiers, a first request to the first data center requesting the first set of identifiers of recovery data and a second request to the second data center requesting the second set of identifiers of recovery data.

6. The method of claim 1, further comprising:
   extracting, by the leader node, the first distribution of geolocations from the first set of identifiers of recovery data;
   extracting, by the leader node, the second distribution of geolocations from the second set of identifiers of recovery data; and
   aggregating, by the leader node, the first distribution of geolocations into a plurality of first groups.

7. The method of claim 6, further comprising:
   aggregating, by the leader node, the second distribution of geolocations into a plurality of second groups; and
   computing, by the leader node, a frequency score for each group of the first groups and the second groups.

8. The method of claim 7, further comprising:
   extracting, by the leader node and from the first groups, a group of the first groups being associated with a geolocation of the first user device; and
   extracting, by the leader node and from the second groups, a group of the second groups being associated with the geolocation of the first user device.

9. The method of claim 8, further comprising:
   comparing, by the leader node, the frequency score associated with the group of the first groups and the frequency score associated with the group of the second groups; and
   selecting, by the leader node, the first data center based on determining that the frequency score associated with the group of the first groups being lower than the frequency score associated with the group of the second groups.

10. The method of claim 6, wherein each group comprises at least one of a city, a state, and a country.

11. The method of claim 1, further comprising:
    storing, by the leader node and to the first data center, a copy of the virtual machine executing on behalf of the first user device, wherein the copy comprises a geolocation of the first user device.

12. The method of claim 1, further comprising:
    receiving, by a leader node and from a second user device, a request to launch a virtual machine executing on behalf of the second user device, wherein a geolocation of the second user device matching the geolocation of the first user device;
    selecting, by the leader node, the second data center based on the first geographic distribution and the second geographic distribution; and
    replicating, by the leader node and at the second data center, recovery data associated with the virtual machine executing on behalf of the second user device.

13. A leader node comprising:
    a processor having programmed instructions that when executed cause the processor to:
    receive a request to launch a virtual machine executing on behalf of a first user device;

retrieve, in response to the request, a first set of identifiers of recovery data from a first data center and a second set of identifiers of recovery data from a second data center;

generate a first distribution of geolocations based on the first set of identifiers of recovery data and a second distribution of geolocations based on the second set of identifiers of recovery data;

select the first data center based on the first distribution and the second distribution; and replicate, at the first data center, recovery data associated with the virtual machine executing on behalf of the first user device.

14. The leader node of claim 13, wherein the processor further includes programmed instructions to:

determine, based on the request, a geolocation of the first user device, wherein the recovery data is associated with a plurality of virtual machines and was previously executed on behalf of a plurality of user devices.

15. The leader node of claim 13, wherein the processor further includes programmed instructions to:

extract a network identifier of the user device from the request, provide, to a geolocation database, the network identifier of the user device, and receive, from the geolocation database, the geolocation of the user device.

16. The leader node of claim 13, wherein the processor further includes programmed instructions to:

send a message to the first user device to cause the first user device to return the message to the leader node;

measure a round-trip time of the message routing between the leader node and the first user device; and determine, based on the round-trip time, a geolocation of the first user device.

17. The leader node of claim 13, wherein the processor further includes programmed instructions to:

retrieve, from a database, a list of data centers of a data center cluster;

extract a plurality of network identifiers associated with the data centers; and send, based on the plurality of network identifiers, a first request to the first data center requesting the first set of identifiers of recovery data and a second request to the second data center requesting the second set of identifiers of recovery data.

18. The leader node of claim 13, wherein the processor further includes programmed instructions to:

extract the first distribution of geolocations from the first set of identifiers of recovery data;

extract the second distribution of geolocations from the second set of identifiers of recovery data; and aggregate the first distribution of geolocations into a plurality of first groups.

19. The leader node of claim 18, wherein the processor further includes programmed instructions to:

aggregate the second distribution of geolocations into a plurality of second groups; and compute a frequency score for each group of the first groups and the second groups.

20. The leader node of claim 19, wherein the processor further includes programmed instructions to:

extract, from the first groups, a group of the first groups being associated with a geolocation of the first user device; and extract, from the second groups, a group of the second groups being associated with the geolocation of the first user device.

21. The leader node of claim 20, wherein the processor further includes programmed instructions to:

compare the frequency score associated with the group of the first groups and the frequency score associated with the group of the second groups; and select the first data center based on determining that the frequency score associated with the group of the first groups being lower than the frequency score associated with the group of the second groups.

22. The leader node of claim 18, wherein each group comprises at least one of a city, a state, and a country.

23. The leader node of claim 13, wherein the processor further includes programmed instructions to:

store, to the first data center, a copy of the virtual machine executing on behalf of the first user device, wherein the copy comprises a geolocation of the first user device.

24. The leader node of claim 13, wherein the processor further includes programmed instructions to:

receive, from a second user device, a request to launch a virtual machine executing on behalf of the second user device, wherein a geolocation of the second user device matching the geolocation of the first user device;

select the second data center based on the first geographic distribution and the second geographic distribution; and replicate, at the second data center, recovery data associated with the virtual machine executing on behalf of the second user device.

25. A non-transitory computer readable storage medium to store a computer program configured to execute a method, the method comprising:

receiving, by a leader node, a request to launch a virtual machine executing on behalf of a first user device;

retrieving, in response to the request and by the leader node, a first set of identifiers of recovery data from a first data center and a second set of identifiers of recovery data from a second data center;

generating, by the leader node, a first distribution of geolocations based on the first set of identifiers of recovery data and a second distribution of geolocations based on the second set of identifiers of recovery data;

selecting, by the leader node, the first data center based on the first distribution and the second distribution; and replicating, by the leader node and at the first data center, recovery data associated with the virtual machine executing on behalf of the first user device.

26. The non-transitory computer readable memory of claim 25, wherein the recovery data is associated with a plurality of virtual machines and was previously executed on behalf of a plurality of user devices.

27. The non-transitory computer readable memory of claim 25, further comprising:

extracting, by the leader node, a network identifier of the user device from the request;

providing, by the leader node and to a geolocation database, the network identifier of the user device, and receiving, by the leader node and from the geolocation database, the geolocation of the user device.

* * * * *